United States Patent [19]

Ito et al.

[11] Patent Number: 4,639,272
[45] Date of Patent: Jan. 27, 1987

[54] LIQUID COLORANT FOR ABS RESINS

[75] Inventors: Masashi Ito, Saitama; Toshio Ohashi; Katsumi Ui, both of Aichi, all of Japan

[73] Assignees: Toyo Ink Mfg., Co., Ltd.; Toyoto Jidosha Kabushiki Kaisha, both of Japan

[21] Appl. No.: 748,879

[22] Filed: Jun. 26, 1985

[30] Foreign Application Priority Data

Jun. 26, 1984 [JP] Japan .................. 59-130056

[51] Int. Cl.$^4$ ............ C08L 91/00; C08L 67/02; C08K 5/10; C08J 3/20
[52] U.S. Cl. ............... 106/243; 106/308 M; 524/88; 524/504
[58] Field of Search ........ 524/88; 106/308 M, 287.24, 106/243

[56] References Cited

U.S. PATENT DOCUMENTS

| | | | |
|---|---|---|---|
| 3,928,254 | 12/1975 | Takayama et al. | 525/7.1 |
| 4,141,929 | 2/1979 | Stoops et al. | 525/12 |
| 4,284,736 | 8/1981 | Comstock et al. | 525/170 |
| 4,332,873 | 6/1982 | Hughes et al. | 430/15 |
| 4,384,057 | 5/1983 | von der Crone | 524/563 |

FOREIGN PATENT DOCUMENTS 033986 5/1974 Japan.
034348 3/1979 Japan.

OTHER PUBLICATIONS

Derwent Abs 79255W/48 Daicel KK (J50D12153) 2-1975.
Derwent Abs. 96959X/52 Dai Nippon Toryo KK J51129310 (11-1976).

Primary Examiner—Herbert J. Lilling
Attorney, Agent, or Firm—Sughrue, Mion, Zinn, Mackpeak and Seas

[57] ABSTRACT

A liquid colorant for ABS resins is described, comprising 100 parts by weight of a pigment or dye and 25 to 2,000 parts by weight of a liquid polyester, and having a viscosity of 1,500 poises or less at room temperature. This liquid polyester is prepared mainly from an aliphatic dicarboxylic acid and a dihydric alcohol, and usually has a viscosity of 10 to 1,500 poises at room temperture. The liquid colorant has advantages such as (1) the dispersibility of the pigment is good, (2) the colorant can be weighed precisely, (3) the colorant does not deteriorate the appearance of the molded article, and (4) the colorant does not deteriorate the physical properties of the molded article.

13 Claims, No Drawings

LIQUID COLORANT FOR ABS RESINS

FIELD OF THE INVENTION

The present invention relates to a liquid colorant for ABS (acrylonitrile/butadiene/styrene) resins. More particularly, the present invention relates to a liquid colorant for ABS resins which when added to the ABS resins, provides molded articles which are free from thermal deformation and bleeding of additives to the surface due to the addition of the colorant.

BACKGROUND OF THE INVENTION

Liquid colorants for resins are known, as described in Japanese Patent Publication No. 33986/78 and Japanese Patent Application (OPI) No. 34348/79 (the term "OPI" as used herein means a "published unexamined Japanese patent application"). These liquid colorants have the following advantages.

(1) Usually, a powdered dry colorant composed of a pigment and a dispersant is preliminarily mixed with resin pellets in a tumbler or a mixer such as a Henschel mixer and then fed to a hopper of, e.g., an extrusion molding machine or an injection molding machine. In this case, therefore, such dry colorants are liable to cause pollution of environment due to the spattering and, furthermore, it is necessary to wash the hopper or mixer when changing the color of the colorants. However, it is known to add the liquid colorants are below the hopper. Thus they do not cause pollution of the environment and it is not necessary to wash the hopper or mixer when changing the color of the colorants.

(2) In accordance with another method, a dry colorant and a resin are mixed, the resulting mixture is compounded in a kneading extruder to prepare a colored compound, and then the colored compound is molded. This is called the "colored pellet method". When the liquid colorants are used, the coloring cost is low compared with the colored pellet method.

(3) In molding a master batch in which a pigment and a dispersant are dispersed in the resin both in high concentrations, a kneader having a high dispersion power such as a Banbury mixer is used. In this case, therefore, the amount of energy consumed is large. On the other hand, the liquid colorants can be kneaded with a kneader requiring a relatively low amount of energy, such as a three-roll mill or an "Attritor" (Trade name of Union Process Co.) (Szegvari Attritor). Thus, when the liquid colorants are used, the production cost is low.

In view of the above advantages, liquid colorants have been increasingly used in the art, greatly contributing to economization of the coloring step.

In feeding a given amount of the liquid colorant below the hopper of the extrusion molding machine or injection molding machine, a diaphragm pump, a plunger pump, a roller pump, and so forth have generally been used. These pumps, however, are limited in their capability to transport liquids of all viscosities. Thus it is necessary to adjust the viscosity of the liquid colorant to 100 poises or less. For this reason, liquid materials which can be used as the dispersants are limited to those materials having a viscosity of several poises at ordinary temperature, such as liquid paraffins, plasticizers, and surface active agents. Liquid colorants prepared using such low viscosity liquid materials as the dispersants are sufficiently satisfactory for the purpose of merely coloring the resin. However, when the colored molded article is used under more severe conditions, the inherent physical properties of the resin used in the production of the molded article may not be held because the dispersant component is liquid. The ABS resins are used particularly as interior parts of the car because of their superior heat resistance. Since these parts are used in a considerably high temperature atmosphere, the thermal deformation and bleeding of the additives to the surface due to the addition of the liquid colorants are seriously accelerated.

Pumps used to feed the colorant have been improved. For example, a gear pump capable of transporting high viscosity liquids having a viscosity of 1,000 poises or more in a definite amount or flow rate is now commercially available.

SUMMARY OF THE INVENTION

Under the circumstances, extensive research on dispersants has been conducted in order to prevent thermal deformation and bleeding of the dispersants to the surface of molded articles of ABS resins when exposed to high temperatures after coloring and molding. As a result, it has been found that a combination of pigment or dye and a certain liquid polyester overcomes the above defects.

Therefore, the present invention provides a liquid colorant for ABS resins, comprising 100 parts by weight of a pigment or dye and from 25 to 2,000 parts, preferably from 40 to 1500 parts, by weight of a liquid polyester, and having a viscosity of 1500 poises or less at room temperature (about 25° C.).

DETAILED DESCRIPTION OF THE INVENTION

The liquid polyester as used herein is prepared from an aliphatic dicarboxylic acid such as adipic acid, sebacic acid, azelaic acid, and glutaric acid as the acid component and a dihydric alcohol such as ethylene glycol, propylene glycol, butylene glycol, pentylene glycol, hexylene glycol, neopentylene glycol, diethylene glycol, 2-ethyl-1,3-hexane diol, and trimethylpentane diol as the alcohol component. In addition to dihydric alcohols, monohydric alcohols such as n-octyl alcohol, iso-octyl alcohol, 2-ethylhexyl alcohol, n-nonyl alcohol, and n-decyl alcohol can be used as the alcohol component in oder to reduce the number of the terminal hydroxy group to control the hydrophilicity of the polyester. The monohydric alcohols can be used in an amount of less than 50 mole %, preferably 30 mole % or less, based on the alcohol component.

The molecular weight of the polyester as used herein is in the range from 500 to 5000.

The acid value of the polyester, which relates to the molecular weight, the viscosity and the pigment-dispersibility of the polyester, is preferably less than 6.0. When the reaction of the formation of the polyester is terminated at high acid value, the polyester having a low molecular weight is obtained and when terminated at low acid value, high molecular weight one is obtained. Thus, if the polyester having an acid value of 6.0 or more is employed, the pigment-dispersibility is decreased.

Examples of the polyester diols, which can be used in the present invention include those which are prepared from the reaction of adipic acid and/or azelaic acid as the acid component and 1,3-butylene glycol, ethylene glycol, trimethylpentane diol, 2-ethyl-1,3-hexane diol or a mixture thereof, as the alcohol component.

The pigment or dye as used herein is not particularly limited. However, it is preferred to employ those pigments commonly used for ABS resin i.e., Dioxazine violet, Phthalocyanine blue, Phthalocyanine green, Brominated Phthalocyanine green, Pigment scarlet 3B lake, Quinacridone red, Helio Bordeaux BL, Perinone red, Perylene vermillion, Perylene scarlet, Perylene red, Permanent Yellow FGL, Cromophtal Yellow 6G, Cromophtal Yellow 3G, Cromophtal Yellow GR, Irgazin Yellow 3RLT, Cromophtal Scarlet R, Cromophtal Red BR, Cromophtal Blue A3R, Cromophtal Blue 4GN, Cromophtal Green GF, Oracet Red 3B, Oracet Violet 2R, Oracet Blue 2R, Amaplast Blue RJK, Amaplast Bordeaux BPS, Palitol Yellow 1090, Thermoplast Brilliant Yellow 10G, Placet Yellow SF-7861, Placet Yellow SF-7862, Placet Pink SF-7867, Placet Red Violet SF-7868, Placet Violet SF-7870, Placet Blue SF-7871, Placet Blue SF-7872, Placet Red SF-7874, Titanium dioxide (rutile), Carbon black, Black iron oxide, Ultramarine blue, Red iron oxide, Alminium flake, etc.

The liquid colorant of the present invention is required to exhibit fluidity at room temperature so that it can be weighed precisely when used. If the viscosity is 1,500 poises or less at room temperature, the liquid colorant can be fed precisely by means of a gear pump, for example. In order that the liquid colorant can be used in all types of pumps, its viscosity is desirably as low as possible. For this reason, it is desirable that the viscosity of the liquid polyester contained in the liquid colorant be as low as possible. The viscosity of the liquid colorant is higher than that of the liquid polyester itself because the pigment or dye having a viscosity higher than that of the liquid polyester is dispersed in the liquid polyester. The increase in the viscosity of the liquid colorant due to the inclusion of the pigment or dye is exemplified below:

| Titanium dioxide (wt. %) | 0 | 20 | 40 | 60 |
| Liquid polyester (wt. %) | 100 | 80 | 60 | 40 |
| Viscosity (poise) | 50 | 150 | 300 | 500 |
| Phthalocyanine blue (wt. %) | 0 | 10 | 20 | 30 |
| Liquid polyester (wt. %) | 100 | 90 | 80 | 70 |
| Viscosity (poise) | 50 | 350 | 700 | 1100 |

Practicaly it is preferred that the viscosity of the liquid polyester be 100 poises or less, more preferably in the range from 10 poises to 50 poises. In preparing a liquid colorant in which a high concentration of the pigment or dye is dispersed, the viscosity of the liquid polyester is preferably 50 poises or less. If, however, the viscosity of the liquid colorant is too low, the thermal deformation of the ultimate molded article might be accelerated. Thus it is practically recommended for the viscosity of the liquid polyester to be at least 10 poises.

In order to decrease the viscosity of a liquid polyester having a relatively high viscosity, a low viscosity liquid ester having a viscosity as low as about 1 to 20 poises can be added in an amount of up to 30 parts by weight per 100 parts by weight of the liquid polyester. Low viscosity liquid esters which can be used for this purpose include dipentaerythritol fatty acid esters, trimethylolpropane fatty acid esters, lauric acid sorbitan ester, oleic acid sorbitan ester, and trioctyl trimellitate.

The liquid colorant of the present invention is prepared by kneading the pigment or dye and the liquid polyester using conventional dispersing machines such as a three-roll mill, a ball mill, a sand mill, and a Szegvari Attritor.

The liquid colorant of the present invention can be used in an amount of not more than 4 parts by weight, preferably in the range of from 0.5 to 2.0 parts by weight, per 100 parts by weight of the ABS resin. The smaller the amount of the colorant, the poorer the coloration of the resulting composition tends to be. On the other hand, the larger the amount of the colorant, the more often screw slip of the molding apparatus tend to occur and the more deteriorated the properties of the colored resin tend to be.

In addition to the pigment or dye and the liquid polyester, various additives conventionally used for ABS resins can be employed. Examples of the additives include a heat-stabilizing agent, an ultraviolet-absorbing agent, an anti-oxidation agent, an anti-static agent, a filler, etc.

The liquid polyester as used herein has excellent properties in that it does not undergo decomposition or modification even at the molding temperature of the ABS resin (the maximum temperature: 280° C.), it exhibits fluidity at room temperature when converted into the liquid colorant by dispersing therein the pigment or dye, and that it has good compatibility with the ABS resin. Therefore, the liquid colorant of the present invention has the following advantages:

(1) The dispersibility of the pigment is good;
(2) The colorant can be fed in a precise amount when used;
(3) It does not deteriorate the appearance of the ultimate molded article;
(4) It does not decrease the physical properties of the molded article;
(5) It does not bleed from the molded article even at elevated temperatures; and
(6) It does not deteriorate the moldability.

The present invention is described in greater detail with reference to the following non-limiting examples. All parts are by weight.

PREPARATION EXAMPLES

Preparation of Vehicle 1

A reactor equipped with a thermometer, a stirrer, a nitrogen gas-introduction tube, a temperature-controlling device, and a partial condenser was charged with 452 parts of adipic acid, and 348 parts of 1,3-butylene glycol. While introducing nitrogen gas, the reaction temperature was gradually increased to 240° C., and the reaction was continued until the acid value reached 10. Then, the partial condenser was removed from the reactor, and the reaction mixture was vacuum distilled at 50 to 60 mm Hg for 1 hour to yield a liquid polyester having an acid value of 2.5 and a viscosity of 20 poises.

Preparation of Vehicle 2

The same reactor as used in the preparation of the vehicle 1 was charged with 320 parts of adipic acid and 480 parts of 2,2,4-trimethylpentane-1,3-diol. While introducing nitrogen gas, the reaction temperature was gradually increased to 210° C., and the reaction was continued until the acid value reached 10. Then, the partial condenser was removed from the reactor, and the reaction mixture was vacuum distilled at 50 to 60 mm Hg for 1 hour to yield a liquid polyester having an acid value of 5.0 and a viscosity of 50 poises.

Preparation of Vehicle 3

A liquid polyester having an acid value of 2.0 and a viscosity of 40 poises was prepared in the same manner as in the preparation of the vehicle 1 except that 320 parts of adipic acid and 480 parts of 2-ethylhexane-1,3-diol were used as the starting materials.

Preparation of Vehicle 4

A liquid polyester having an acid value of 1.5 and a viscosity of 60 poises was prepared in the same manner as in the preparation of the vehicle 1 except that 423 parts of adipic acid, 302 parts of n-pentanediol, and 75 parts of diethylene glycol were used as the starting materials.

EXAMPLE 1

| | |
|---|---|
| Vehicle 1 | 55.0 parts |
| Phthalocyanine Blue | 20.0 parts |
| Anthraquinone-based Red Dye | 5.0 parts |
| Titanium Oxide | 15.0 parts |
| Carbon Black | 5.0 parts |

The above ingredients were kneaded in a three-roll mill to prepare a liquid colorant. The viscosity of the liquid colorant as determined with a B-type viscometer at 25° C. was 320 poises.

The liquid colorant was added to an ABS resin and injection molded by the use of an injection molding machine (Toshiba IS 80A) to form a test specimen. The heat distortion temperature of the test specimen was measured according to JIS K 7207. The results are shown in Table 1.

EXAMPLE 2

| | |
|---|---|
| Vehicle 2 | 43.0 parts |
| Titanium Oxide | 46.0 parts |
| Iron Oxide (III) (red) | 0.6 part |
| Iron Oxide (III) (yellow) | 8.4 parts |
| Carbon Black | 2.0 parts |

The above ingredients were kneaded in the same manner as in Example 1 to prepare a liquid colorant having a viscosity of 180 poises. A test specimen was produced using the liquid colorant in the same manner as in Example 1, and the heat distortion temperature of the test specimen was measured also in the same manner as in Example 1. The results are shown in Table 1.

EXAMPLE 3

| | |
|---|---|
| Vehicle 3 | 42.0 parts |
| Titanium Oxide | 11.0 parts |
| Iron Oxide (III) (yellow) | 40.0 parts |
| Iron Oxide (III) (red) | 1.0 part |
| Carbon Black | 1.5 parts |
| Anthraquinone-based Yellow Dye | 4.5 parts |

The above ingredients were kneaded in the same manner as in Example 1 to prepare a liquid colorant having a viscosity of 210 poises. A test specimen was produced using the liquid colorant in the same manner as in Example 1, and the heat distortion temperature of the test specimen was measured also in the same manner as in Example 1. The results are shown in Table 1.

EXAMPLE 4

| | |
|---|---|
| Vehicle 4 | 50 parts |
| Phthalocyanine Blue | 10 parts |
| Titanium Oxide | 20 parts |
| Ultramarine Blue | 20 parts |

The above ingredients were kneaded in the same manner as in Example 1 to prepare a liquid colorant having a viscosity of 520 poises. A test specimen was produced using the liquid colorant having a viscosity of 520 poises. A test specimen was produced using the liquid colorant in the same manner as in Example 1, and the heat distortion temperature of the test specimen was measured also in the same manner as in Example 1. The results are shown in Table 1.

EXAMPLE 5

| | |
|---|---|
| Vehicle 2 | 55.0 parts |
| Phthalocyanine Blue | 20.0 parts |
| Anthraquinone-based Red Dye | 5.0 parts |
| Titanium Oxide | 15.0 parts |
| Carbon Black | 5.0 parts |

The above ingredients were kneaded in the same manner as in Example 1 to prepare a liquid colorant having a viscosity of 480 poises. A test specimen was produced using the liquid colorant in the same manner as in Example 1, and the heat distortion temperature of the test specimen was measured also in the same manner as in Example 1. The resultants are shown in Table 1.

COMPARATIVE EXAMPLE 1

| | |
|---|---|
| Nonionic Surface Active Agent (2 poises) | 5.0 parts |
| Phthalocyanine Blue | 20.0 parts |
| Anthraquinone-based Red Dye | 5.0 parts |
| Titanium Oxide | 15.0 parts |
| Carbon Black | 5.0 parts |

The above ingredients were kneaded in the same manner as in Example 1 to prepare a liquid colorant having a viscosity of 50 poises. A test specimen was produced using the liquid colorant in the same manner as in Example 1, and the heat distortion temperature of the test specimen was measured also in the same manner as in Example 1. The results are shown in Table 1.

The liquid colorants prepared in Examples 1 to 5 and Comparative Example 1 were each added to an ABS resin in an amount as indicated in Table 1 and molded using an injection molding machine (Toshiba IS 80A) to produce a test specimen. The heat distortion temperature of each test specimen was measured according to JIS K 7207. The ABS resins used were as follows:

Resin A Saicolak EX-190 (produced by Ube Saicon Co., Ltd.)

Resin B Clarastick MH (produced by Sumitomo Norgatack Co., Ltd.)

TABLE 1

| Resin | Liquid Colorant Type | Amount (parts) | Heat Distortion Temperature (°C.) |
|---|---|---|---|
| A | — | — | 91.4 |
| " | Example 1 | 1.3 | 90.6 |
| " | Example 2 | 1.0 | 91.2 |

TABLE 1-continued

| Resin | Liquid Colorant Type | Amount (parts) | Heat Distortion Temperature (°C.) |
|---|---|---|---|
| " | Example 2 | 1.5 | 90.5 |
| " | Example 3 | 1.3 | 90.8 |
| " | Example 4 | 1.3 | 90.6 |
| " | Example 5 | 1.3 | 90.6 |
| " | Comparative Example 1 | 1.0 | 89.8 |
| " | Comparative Example 1 | 1.5 | 89.0 |
| B | — | — | 93.3 |
| " | Example 1 | 1.3 | 92.8 |
| " | Example 2 | 1.3 | 92.7 |
| " | Example 3 | 1.0 | 93.0 |
| " | Example 3 | 1.5 | 92.5 |
| " | Example 4 | 1.3 | 92.7 |
| " | Example 5 | 1.3 | 92.7 |
| " | Comparative Example 1 | 1.0 | 92.0 |
| " | Comparative Example 1 | 1.5 | 91.4 |

Note:
Fiber stress: 18.56 kg/cm$^2$

The liquid colorants prepared in Examples 1 to 5 were each added to an ABS resin (Saicolak EX-190, produced by Ube Saicon Co., Ltd.) in an amount of 1.3 parts by weight per 100 parts by weight of the ABS resin and molded with an injection molding machine (Toshiba 800T) to produce a molded article. All the molded articles had an excellent appearance.

Molded articles were produced in the same manner as above except that the type of the ABS resin was changed from Saicolak EX-190 to Saicolak T (produced by Ube Saicon Co., Ltd.). All the molded articles also had an excellent appearance.

While the invention has been described in detail and with reference to specific embodiments thereof, it will be apparent to one skilled in the art that various changes and modifications can be made therein without departing from the spirit and scope thereof.

What is claimed is:

1. A liquid colorant for ABS resins, consisting essentially of 100 parts by weight of a pigment or dye and 25 to 2,000 parts by weight of a saturated liquid polyester prepared mainly from an aliphatic dicarboxylic acid and an alcohol component comprising a dihydric alcohol, and having a viscosity of 1,500 poises or less at room temperature.

2. The liquid colorant as claimed in claim 1, consisting essentially of 100 parts by weight of the pigment or dye and 40 to 1500 parts by weight of the liquid polyester.

3. The liquid colorant as claimed in claim 1, wherein the pigment or dye is at least one member selected from the group consisting of Dioxazine violet, Phthalocyanine blue, Phthalocyanine green, Brominated Phthalocyanine green, Pigment scarlet 3B lake, Quinacridone red, Helio Bordeaux BL, Perinone red, Perylene vermillion, Perylene scarlet, Perylene red, Permanent Yellow FGL, Cromophtal Yellow 6G, Cromophtal Yellow 3G, Cromophtal Yellow GR, Irgazin Yellow 3RLT, Cromophtal Scarlet R, Cromophtal Red BR, Cromophtal Blue A3R, Cromophtal Blue 4GN, Cromophtal Green GF, Oracet Red 3B, Oracet Violet 2R, Oracet Blue 2R, Amaplast Blue RJK, Amaplast Bordeaux BPS, Palitol Yellow 1090, Thermoplast Brilliant Yellow 10G. Placet Yellow SF-7861, Placet Yellow SF-7862, Placet Pink SF-7867, Placet Red Violet SF-7868, Placet Violet SF-7870, Placet Blue SF-7871, Placet Blue SF-7872, Placet Red SF-7874, Titanium dioxide (rutile), Carbon black, Black iron oxide, Ultramarine blue, Red iron oxide, and Alminium flake.

4. The liquid colorant as claimed in claim 1, wherein the alcohol component containing less than 50 mole% of a monohydric alcohol.

5. The liquid colorant as claimed in claim 4, wherein the alcohol component containing less than 30 mole% of a monohydric alcohol.

6. The liquid colorant as claimed in claim 1, wherein the liquid polyester has an acid value of less than 6.0.

7. The liquid colorant as claimed in claim 1, wherein the liquid polyester has an molecular weight of the range from 500 to 5,000.

8. The liquid colorant as claimed in claim 1, wherein the liquid polyester has a viscosity of 100 poises or less.

9. The liquid colorant as claimed in claim 8, wherein the liquid polyester has a viscosity of from 10 to 50 poises.

10. The liquid colorant as claimed in claim 1, wherein the aliphatic dicarboxylic acid is at least one member selected from the group consisting of adipic acid, sebacic acid, azelaic acid, and glutaric acid.

11. The liquid colorant as claimed in claim 1, wherein the dihydric alcohol is at least one member selected from the group consisting of ethylene glycol, propylene glycol, butylene glycol, pentylene glycol, hexylene glycol, neopentylene glycol, diethylene glycol, 2-ethyl-1,3-hexane diol, and trimethylpentane diol.

12. The liquid colorant as claimed in claim 4, wherein the monohydric alcohol is at least one member selected from the group consisting of n-octyl alcohol, isooctyl alcohol, 2-ethylhexyl alcohol, n-nonyl alcohol, and n-decyl alcohol.

13. The liquid colorant as claimed in claim 5, wherein the monohydric alcohol is at least one member selected from the group consisting of n-octyl alcohol, isooctyl alcohol, 2-ethylhexyl alcohol, n-nonyl alcohol, and n-decyl alcohol.

* * * * *